3,210,436
PROCESS FOR DEHYDROGENATION
Laimonis Bajars and Russell M. Mantell, Princeton, N.J., assignors to Petro-Tex Chemical Corporation, Houston, Tex., a corporation of Delaware
No Drawing. Filed May 28, 1962, Ser. No. 197,886
12 Claims. (Cl. 260—680)

This application is a continuation-in-part of our earlier filed application Serial Number 856,339, filed December 1, 1959 and now abandoned.

This invention relates to a process for dehydrogenating organic compounds and relates more particularly to the dehydrogenation of aliphatic hydrocarbons at elevated temperatures in the presence of oxygen and bromine.

The dehydrogenation of aliphatic hydrocarbons such as butenes to butadiene is accomplished commercially by passing butenes at high temperatures over various solid catalysts. Over modified iron oxide catalysts butenes are converted to butadiene at conversions of about 25 percent and yields of about 19 percent in the presence of steam at flow rates of about 300 v./v./hr. While these yields are commercial, it has been a continuing object of those skilled in the art to provide processes with higher yields of butadiene and other unsaturated aliphatic hydrocarbons.

We have now discovered that greatly improved yields of unsaturated aliphatic hydrocarbons are obtained by dehydrogenating in the vapor phase at elevated temperatures aliphatic hydrocarbons in admixture with oxygen and bromine in the presence of certain metals or compounds thereof under conditions such that the equivalent partial pressure of the hydrocarbons to be dehydrogenated is less than one-half atmosphere.

The invention is suitably carried out, for example, by reacting butene with more than about 0.001 mol of molecular bromine fed as $Br_2$, or the equivalent amount of a bromine liberating compound, per mol of butene, and at least one-fourth mol of oxygen per mol of butene at a temperature in the range of about 400° C. to about 800° C. at a butene partial pressure equivalent to below 10 inches mercury absolute, when the total pressure is one atmosphere, with a catalyst comprising atoms selected from the group consisting of atoms of metal elements of Periodic Table [1] Groups IA, IIA, IIIB, IVB, VB, VIB, VIIB, VIII and mixtures thereof.

According to this invention high yields, conversions and selectivities of the unsaturated product are obtained even when using low concentrations of bromine. High yields, conversions and selectivities are obtained at relatively low inlet reactor temperatures. The high selectivities and conversions are of economic advantage for efficient utilization of feedstock and straightforward and efficient purification of the desired product is accomplished because of the high yields and selectivities as compared to prior art processes. An additional advantage is that the catalyst is not easily coated with carbon as in some prior art processes, and therefore the catalyst is autoregenerative in this process. The process requires little, if any, energy input and it is an advantage that the process may be operated adiabatically.

One essential feature of the novel process of this invention is the use of certain metals and their compounds. These materials may be considered as catalysts for the reaction although their function and mode of operation is not completely understood. A variety of metals and active compounds thereof such as inorganic salts, oxides and hydroxides have been found to be effective in attaining high conversion, selectivity and yield of unsaturated hydrocarbons in accordance with the process of this invention. Materials such as the following have been successively used to dehydrogenate aliphatic hydrocarbons to obtain high yields of unsaturated hydrocarbons such as butadiene-1,3 and isoprene from butene and methyl butene under conditions defined hereinafter: ferrous oxide, ferric oxide, titanium oxide, chromium oxide, tantalum oxide, cerium oxide, zirconium oxide, manganeous oxide, manganese oxide (ous-ic), molybdenum oxide, vanadium pentoxide, cobaltous oxide, nickelous oxide, tungstic acid, palladium oxide, magnesium oxide, lanthanum oxide, niobium pentoxide (columbian pentoxide), calcium oxide, magnesium phosphate, manganese phosphate, sodium fluoride, stainless steel as the reactor wall in small diameter tubular reactors, stainless steel wool, stainless steel rings, iron, tantalum, manganese, vanadium oxyphosphate, calcium carbonate, calcium sulfate, sodium hydroxide, sodium chloride, potassium oxide, chromic chloride, cobaltous chloride, iron phosphide, potassium silicate and barium sulfide. Examples of other useful compounds include molybdenum phosphate, rubidium dioxide, cesium chloride, potassium phosphate, barium oxide, potassium carbonate, potassium fluoride, beryllium oxide, strontium oxide, calcium fluoride, iron chloride, chromium phosphate, calcium hydroxide, hafnium oxide, scandium bromide, barium carbonate, iron carbonate, iron sulfate, sodium oxide, iron hydroxide, lithium chloride, iron phosphate, titanium, iron alloys, lanthanum hydroxide, lanthanum carbonate, cerium hydroxide and the like. Mixtures of the materials listed above in any combination of two or more are also useful.

In general, atoms of metals of the Periodic Table Groups IA, IIA, IIIB, IVB, VB, VIB, VIIB, VIII (the preferred VIII metals are in the fourth period) are effective in the process of this invention. The atoms may be present such as in the form of the elemental metals, metal oxides, salts or hydroxides. Many of these metals, salts and hydroxides may change during the preparation of the catalyst, during heating in a reactor prior to use in the process of this invention, or are converted to another form under the described reaction conditions, but such materials still function as an effective catalyst in the defined process to give increased yields of unsaturated product. Most metals, nitrates, nitrites, carbonates, hydroxides, acetates, sulfites, silicates, sulfides and the like are probably converted to the corresponding oxide or bromide under the reaction conditions defined herein. For instance, potassium nitrate and iron sulfate are converted at least to some extent to the corresponding oxides while being heated in a reactor to a reaction temperature of about 500° C. Thus, in the claims and specification when reference is made to the catalyst being a metal compound such as particular metal oxides or halides, this is intended to include the presence of these oxides or halides regardless of the source; for example, the oxides or halides introduced to the reactor as such or the oxides or halides formed during the course of the reaction would both be included. Such salts as the phosphates, sulfates, halides, some carbonates, and hydroxides and the like, of the defined metal groups, which are normally stable at the defined reaction temperatures are likewise effective under the conditions of the described reaction, as well as such metal compounds as the metal molybdates. Particularly effective in the process of this invention are the defined metals and their oxides and phosphates. In addition, any metal or compound thereof of these groups which are convertible to or are converted under the described reaction conditions to an active catalytic state as the metal, oxide or salt thereof are likewise effective in the ---
[1] All references in this application are to the Periodic Table as found on pages 400–401 of the 39th edition (1957–1958) of the Handbook of Chemistry & Physics (Chemical Rubber Publishing Company).

process of this invention. Thus, the atoms of the defined catalytic metallic elements are introduced into the reactor in any manner wherein the metallic atoms will be present to catalyze the reaction. Generally the catalytic atoms will be introduced into the reactor as a compound of the metal which, under the conditions of reaction, has a boiling point higher than the temperature of reaction, such as a boiling point of at least 600° C. or 750° C., or may be introduced as a compound which will be converted to a compound which has a boiling point higher than the temperature of reaction. The metal oxides represent a useful class of materials, since they are inexpensive and are readily formed in situ from metals, salts and hydroxides.

Although a great variety of metals and compounds have been found to be useful in the process of this invention, certain of the metals and metal compounds are preferred. Preferred metals and compounds thereof are those of the alkali, alkaline earth, rare earth and the transition metal compounds with the exception of those of Group IB. Thus, the preferred metals and compounds thereof would be those of Groups IA, IIA, IIIB, IVB, VB, VIB, VIIB, VIII and mixtures thereof. In Group VIII the preferred atoms are in the fourth period, that is, iron, cobalt, and nickel. Particularly desirable catalysts are those that contain as active catalytic ingredients atoms of Li, Na, K, Rb, Cs, Be, Mg, Ca, Sr, Ba, Sc, La, Ti, Zr, Hf, V, Nb, Ta, Cr, Mo, W, Mn, Fe, Co, Ni, Ce, Pr, Nd, Sm and mixtures thereof. The corresponding oxides, halides, inorganic salts such as the halides, phosphates, and hydroxides are particularly desirable as catalysts.

In the above descriptions of catalyst compositions, the composition described is that of the surface which is exposed in the dehydrogenation zone to the reactants. That is, if a catalyst carrier is used, the composition described as the catalyst refers to the composition of the surface and not to the total composition of the surface coating plus carrier. The catalytic compositions are intimate combinations or mixtures of the ingredients. These ingredients may or may not be chemically combined or alloyed. Inert catalyst binding agents or fillers may be used, but these will not ordinarily exceed about 50 percent or 65 percent by weight of the catalytic surface. The weight percent of the defined catalytic atoms will generally be at least 20 percent, and preferably at least 35 percent of the composition of the catalyst surface.

The amount of solid catalyst utilized may be varied depending upon such variables as the activity of the catalyst, the amount of bromine and oxygen used, the flow rates of reactants and the temperature of reaction. When a solid catalyst is used, the amount of catalyst will be present in an amount of greater than 10 square feet of catalyst surface per cubic foot of reaction zone containing catalyst. Better results may be observed at ratios such as at least 25 or 40 square feet of catalyst surface per cubic foot of reaction zone. The catalyst is more effectively utilized when the catalyst is present in an amount of at least 75 square feet of catalyst surface per cubic foot of reaction zone containing catalyst, and preferably the ratio of catalyst surface to volume will be at least 120 square feet of catalyst surface per cubic foot of reaction zone containing catalyst.

It will be readily recognized by the man skilled in the art that efficient and economical operations under the described reaction conditions will be a factor in the selection of a particular catalyst material or combination of catalyst materials. Stainless steel is a useful material because of its activity, stability, ease of handling and the like. The term "stainless steel" includes those metal alloys that are characterized by their pronounced resistance to corrosion. Examples of some of the desirable stainless steels are described in Kirk-Othmer Encyclopedia of Chemical Technology (Interscience Publishing Company). In volume 12 (copyright 1954) at pages 821 to 826 are described the A.I.S.E. Series 300, 400 and 500 stainless steels. The Austenitic series stainless steels, which are the 300 series, are particularly desirable. Other examples of desirable stainless steels are the high nickel alloys such as those described at pages 275 to 288 of volume 9 (copyright 1952) of the same encyclopedia. Particularly desirable nickel alloys are those described on page 280 of volume 9. These high nickel alloys contain at least 15 percent nickel. Any of the stainless steels, which contain about 4 to 27 percent chromium, from 0 to 15 percent nickel and in some instances a small amount of molybdenum or manganese, may also be employed. Particularly useful are any other combinations and alloys of the various metals found in the defined groups above. Metals and compounds thereof which have low melting points are suitably employed, for example, on porous carriers. The technique of fluidized beds lends itself well to the process of this invention. Of course, reactors lined with quartz or other inactive materials can be used if loaded with active materials of the nature described.

Excellent results have been obtained by packing the reactor with catalyst particles as the method of introducing the catalytic surface. The size of the catalyst particles may vary widely but generally the maximum particles size will pass through a Tyler standard screen which has openings of 2 inches, and generally the largest particles of catalyst will pass through a Tyler screen with 1 inch openings. Very small particles size carriers may be utilized. In order to avoid high pressure drops across the reactor generally at least 50 percent by weight of the catalyst will be retained by a 10 mesh Tyler standard screen which has openings of $\frac{1}{16}$ inch. However, if a fluid bed reactor is utilized, catalyst particles may be quite small, such as from about 10 to 300 microns. Thus, the particle size may be from about 10 microns to those that are no greater than 2 inches in the smallest dimension. If a carrier is used the catalyst may be deposited on the carrier by methods known in the art such as by preparing an aqueous solution or dispersion of the metal or metal compound and then mixing the carrier with the solution or dispersion until the active ingredients are coated on the carrier. The coated particles may then be dried, for example, in an oven at about 110° C. Various other methods of catalyst preparation known to those skilled in the art may be used. When carriers are utilized, these will be approximately of the same size as the final coated catalyst particle, that is, the carriers will generally be retained on 10 mesh Tyler screen and will pass through a Tyler screen with openings of 2 inches. Very useful carriers are Alundum, silicon carbide, Carborundum, pumice, Kieselguhr, asbestos, and the like. The Alundums or other alumina carriers are particularly useful. When carriers are used, the amount of catalyst on the carrier will generally be in the range of about 5 to 75 weight percent of the total weight of the active catalytic material plus carrier. The carriers may be of a variety of shapes, including irregular shapes, cylinders or spheres. Another method for introducing the required surface is to utilize as a reactor a small diameter tube wherein the tube wall is catalytic or is coated with catalytic material. Other methods may be utilized to introduce the catalytic surface such as by the use of rods, wires, mesh or shreds and the like of catalytic material.

The total pressure on systems employing the process of this invention normally will be at or in excess of atmospheric pressure, although subatmospheric pressure can be used. Higher pressures, such as about 100 or 200 p.s.i.g. may be used. However, the initial partial pressure of the hydrocarbon to be dehydrogenated is an important and critical feature of the invention. The partial pressure of the hydrocarbon to be dehydrogenated should be equivalent to below about 10 inches mercury absolute, or $\frac{1}{3}$ atmosphere, when the total pressure is one atmosphere to realize the advantages of this invention. Also because the initial partial pressure of the hydrocarbon to be dehydrogenated is equivalent to less than about 10 inches of mercury at a total pressure of one atmosphere, the combined partial pressure of the hydrocarbon to be dehydrogenated plus the dehydrogenated hydrocarbon will also be equivalent to less than about 10 inches of mercury. For example, if butene is being dehydrogenated to butadiene, at no time will the combined partial pressure of the butene and butadiene be greater than equivalent to about 10 inches of mercury at a total pressure of one atmosphere. Preferably the hydrocarbon to be dehydrogenated should be maintained at a partial pressure equivalent to less than one-third the total pressure, such as no greater than six inches or no greater than four inches of mercury, at a total pressure of one atmosphere. The desired pressure is obtained and maintained by techniques known to those skilled in the art, including vacuum operations, or by using helium, organic compounds, nitrogen, steam and the like, or by a combination of these methods. Steam is particularly advantageous and it is surprising that the desired reactions to produce high yields of product are effected in the presence of large amounts of steam. When steam is employed, the ratio of steam to hydrocarbon to be dehydrogenated is normally within the range of about 4 to 20 or 30 mols of steam per mol of hydrocarbon, and generally will be between 8 and 15 mols of steam per mol of hydrocarbon. When air is employed as the source of oxygen, then less steam normally will be required. The degree of dilution of the reactants with steam, nitrogen and the like is related to keeping the partial pressure of hydrocarbon to be dehydrogenated in the system equivalent to preferably below 10 inches of mercury at one atmosphere total pressure. For example, in a mixture of one mol of butene, three mols of steam and one mol of oxygen under a total pressure of one atmosphere the butene would have an absolute pressure of one-fifth of the total pressure, or roughly six inches of mercury absolute pressure. Equivalent to this six inches of mercury butene absolute pressure at atmospheric pressure would be pure butene under a vacuum such that the total pressure is six inches of mercury absolute. A combination of a diluent such as steam together with a vacuum may be utilized to achieve the desired partial pressure of the hydrocarbon. For the purpose of this invention, also equivalent to the six inches of mercury butene absolute pressure at atmospheric pressure would be the same mixture of one mol of butene, three mols of steam and one mol of oxygen under a total pressure greater than atomspheric, for example, a total pressure of 15 or 20 inches mercury above atmospheric. Thus, when the total pressure on the reaction zone is greater than one atmosphere, the absolute values for the pressure of butene will be increased in direct proportion to the increase in total pressure above one atmosphere. Another feature of this invention is that the combined partial pressure of the hydrocarbon to be dehydrogenated plus the bromine liberating material will also be equivalent to less than 10 inches of mercury, and preferably less than 6 or 4 inches of mercury, at a total pressure of one atmosphere. The lower limit of hydrocarbon partial pressure will be dictated by commercial considerations and practically will be greater than about 0.1 inch mercury.

The minimum amount of oxygen used generally will be from at least about one-fourth mol of oxygen per mol of hydrocarbon being dehydrogenated to about 2 mols or more of oxygen per mol of hydrocarbon to be dehydrogenated. As much as 5 mols of oxygen or higher have been employed. High selectivity has been obtained when amounts of oxygen from greater than 0.25 to about 1 mol of oxygen per mol of hydrocarbon were employed. High conversions have been obtained when the amount of oxygen was varied from about 0.75 to about 1.75 mols of oxygen per mol of hydrocarbon. Maximum yields of diolefin product have been obtained with amounts of oxygen from about 0.4 to about 1.25 mols of oxygen per mol of hydrocarbon, so that within the range of 0.25 to 2.0, and preferably 0.3 or 0.4 to 1.75 total mols of oxygen per mol of hydrocarbon to be dehydrogenated, economic and operational considerations will dictate the exact molar ratio of oxygen to hydrocarbon. A particularly useful range is from about 0.4 to one mole of oxygen per mol of hydrocarbon. Oxygen is supplied to the system as pure oxygen or the oxygen may be diluted with inert gases such as helium, carbon dioxide and nitrogen. Air is entirely satisfactory as the source of oxygen. In relation to bromine, the amount of oxygen employed will be greater than 1 or greater than 1.5 mols of oxygen per atom of bromine. Usually the ratio of mols of oxygen to atoms of bromine will be higher such as at least 2.5 or from about 5.0 to 250 and preferably the ratio will be between 8 and 150 mols of oxygen per atom of bromine.

Bromine employed in the process of this invention may be bromine itself, hydrogen bromide, organic bromides or any bromine containing compound which decomposes or volatilizes under the reaction conditions defined herein to liberate or provide the specified amount of free bromine or hydrogen bromide. Such organic bromine compounds may include alkyl bromides such as aliphatic bromides of from one to six carbon atoms including ethyl bromide, propyl bromide, bromoform, butyl bromide, amyl bromide, hexyl bromide, and the like. Both primary, secondary and tertiary alkyl bromides may be employed. Similarly, aromatic and heterocyclic bromides may be employed. It is an advantage of this invention that the hydrogen bromide leaving the reactor may be recycled to the stream entering the dehydrogenation zone without the necessity of processing or converting it to another form. It should be understood that when bromine is referred to herein, both in the specification and the claims, that the equivalent amount of elemental bromine is understood, regardless of the initial source of the bromine.

Amounts of bromine as small as about 0.001 mol of bromine per mol of hydrocarbon to be dehydrogenated have been found to be effective in the process of this invention. The bromine concentration normally will be varied from about 0.01 mol to about 0.2 mol of bromine per mol of olefin. Although amounts of bromine in excess of about 0.2 mol may be employed, such as 0.5 mol, these larger amounts are not preferred. Amounts of bromine, or the equivalent bromine-liberating compound, of about 0.005 mol to about 0.05 or up to 0.09 or 0.1 mol per mol of hydrocarbon to be dehydrogenated are preferred. Preferably, the bromine will be present in an amount no greater than 10 mol percent of the total feed to the reactor. Also preferably, the bromine will be present from about 2 to 25 weight percent of the hydrocarbon to be dehydrogenated.

The temperature at which the reaction is conducted is from above about 400° C. to temperatures as high as about 800° C. Excellent results are ordinarily obtained within the range of about 475° C. to about 725° C., such as up to 750° C. Butadiene-1,3 has been obtained in good yield from butene at about 550° C. to about 750° C., and isoprene has been obtained in good yield from methyl butene at temperatures from about 425° C. to 750° C. An advantage of this invention is the extremely wide latitude of reaction temperatures.

The flow rates of the hydrocarbon to be dehydrogenated may be varied quite widely and can be readily established by those skilled in the art. Good results have been obtained with hydrocarbon to be dehydrogenated flow rates ranging from about ¼ to 4 liquid volumes calculated at standard conditions of 25° C. and 760 mm. of mercury of hydrocarbon to be dehydrogenated per volume of reactor zone packed with active surface per hour (liquid v./v./hr.). The residence or contact time of the reactants in the reaction zone under any given set of reaction conditions depends upon all the factors involved in the reaction. Contact times ranging from about 0.1 to about 5 to 10 seconds have been found to be quite satisfactory. However, a wider range of residence times may be employed which may be as low as about 0.01 second to as long as several minutes, although such long reaction times are not preferred. Normally the shortest contact time consonant with optimum yields and operating conditions is desired, for example 0.1 to 1 second. Residence time is the calculated dwell time of the reaction mixture in the reaction zone assuming the mols of product mixture are equivalent to the mols of feed mixture. For the purpose of calculation the reaction zone is the portion of the reactor packed with the active surface.

A variety of reactor types may be employed. For example, tubular reactors of small diameter made of stainless steel or other metals or alloys of the metals described above as catalysts for the reaction may be employed. Large diameter reactors will require loading with an active material to provide the required surface for efficient operation. Fixed bed reactors containing the metal or metal compound catalysts in the form of grids, screens, pellets, or supports and the like may also be used. In any of these reactors suitable means for reactor temperature control may be provided. Fluid and moving bed systems are readily applied to the processes of this invention.

The manner of mixing the bromine or bromine compound, hydrocarbon, oxygen containing gas and steam, if employed, is subject to some choice. In normal operations the hydrocarbon may be preheated and mixed with steam and preheated oxygen or air and bromine or hydrogen bromide mixed therewith prior to passing the stream in vapor phase over the catalyst bed. Hydrogen bromide or a source of bromine solution may be mixed with steam or air prior to reaction. Any of the reactants may be split and added incrementally. For example, part of the bromine may be mixed with the hydrocarbon to be dehydrogenated and the oxygen. The mixture may then be heated to effect some dehydrogenation and thereafter the remainder of the bromine added to effect further dehydrogenation. The effluent reaction product from the reactor is cooled and then passed to means for removing bromine as in a caustic scrubber. The hydrocarbon product is then suitably purified as by fractionation to obtain the desired high purity unsaturated product.

Hydrocarbons effectively dehydrogenated according to the process of this invention are selected from the group consisting of mono-olefins of 4 to 6 carbon atoms, saturated aliphatic hydrocarbons of 4 to 5 carbon atoms and mixtures thereof. Examples of feed materials are butene-1, butene-2, 2-methyl butene-3, 2-methyl butene-1, 2-methyl butene-2, n-butane, methyl butane, 2-methyl pentene-1 and 2-methyl pentene-2. For example, n-butane, may be converted to a mixture of butene-1, butene-2, butadiene-1,3 and a mixture of n-butane and butene-2 may be converted to butadiene-1,3 or a mixture of butadiene-1,3 together with some butene-2 and butene-1. The process of this invention is particularly effective in dehydrogenating aliphatic hydrocarbons to provide a product wherein the major unsaturated product has the same number of carbon atoms as the feed hydrocarbon.

In the following examples will be found specific embodiments of the invention and details employed in the practice of the invention. Percent conversion refers to the mols of olefin consumed per 100 mols of olefin fed to the reactor, percent selectivity represents the mols of di-olefin formed per 100 mols of olefin consumed, and percent yield refers to the mols of diolefin formed per mol of olefin fed. All quantities of bromine expressed are calculated as mols of $Br_2$. In all of the examples unless expressed otherwise: The runs were made in a Vycor [2] reactor which was one inch internal diameter; the overall length of the reactor was about 36 inches with the middle 24 inches of the reactor being encompassed by a heating furnace; the bottom 6 inches of the reactor was empty; at the top of this 6 inches was a retaining plate, and on top of this plate were placed 6 inches of the catalyst particles; the remainder of the reactor was filled with 6 mm. x 6 mm. inert Vycor Raschig rings; the actives of the catalyst were coated on 6 mm. x 6 mm. inert Vycor Raschig rings by depositing a water slurry of the active material on the rings followed by drying overnight at about 110° C., and the flow rates were calculated on the volume of the 6 inch long by 1 inch diameter portion of the reactor which was filled with the catalyst particles. These examples are intended as illustrative only, since numerous modifications and variations in accordance with the disclosure herein will be apparent to those skilled in the art.

Examples 1 through 6

The Vycor reactor, containing Vycor Raschig rings having deposited thereon the hereinafter designated metal compounds, was heated by means of an external electric furnace. At a 700° C. furnace temperature, in a series of runs a butene-2 flow rate was maintained at 1 liquid volume of butene-2 per volume of reactor packed with catalyst per hour (lv./v./hr.), mixed with oxygen and steam at mol ratios of butene-2 to steam to oxygen of 1 to 16 to 0.85. Hydrogen bromide was added as an aqueous solution containing 48 percent HBr at a rate which was equivalent to 0.028 mol of bromine ($Br_2$) per mol of butene-2. The butene and oxygen were added to the top of the reactor, hydrogen bromide was added to this stream as it entered the reactor and steam was added separately opposite this stream. The rings were coated with the metal oxides from water slurries thereof and dried in a stream of air before use. The reactor effluent was quenched with water and then scrubbed with caustic solution and the hydrocarbon stream was fractionated and butadiene-1,3 recovered. The results obtained on stream samples are in tabular form reported as mol percent conversion, mol percent selectivity and mol percent yield of butadiene-1,3 per pass.

| Example | Coating | Percent conversion | Percent selectivity | Percent Yield butadiene-1,3 |
|---|---|---|---|---|
| 1 | Zirconium dioxide | 94 | 65 | 61 |
| 2 | Tantalum dioxide | 89 | 67 | 60 |
| 3 | Lanthanum oxide | 91 | 72 | 66 |
| 4 | Columbium oxide | 85 | 65 | 55 |
| 5 | Molybdenum oxide | 89 | 63 | 56 |
| 6 | Magnesium phosphate | 81 | 64 | 52 |

In Examples 7 through 9 a Vycor reactor having bed temperatures as specified below was used, butene-1 was passed over the hereinafter described metal oxides, which were deposited on Vycor Raschig rings, mixed with 15 mols of steam per mole of butene-1 and 0.85 mol of oxygen per mol of butene-1 at flow rates and bromine ($Br_2$) in the concentrations specified:

Example 7

With titanium dioxide, at 550° C., 0.084 mol of bromine (fed as hydrogen bromide) per mol of butene, and a butene flow rate of ½ liquid v./v./hr., butene was converted to butadiene at a conversion of 88 percent, selectivity of 79 percent and yield of 70 percent.

Example 8

With vanadium pentoxide, at 550° C., 0.084 mol of bromine (fed as hydrogen bromide) per mole of butene-1, and a butene flow rate of ½ liquid v./v./hr., butene-1 was converted to butadiene at a conversion of 93 percent, selectivity of 81 percent and a yield of 75 percent. At 550° C. with 0.028 mol of bromine (fed as hydrogen bromide) per mol of butene-1, and at a flow rate of butene of 1 liquid v./v./hr. butene-1 was converted to butadiene at a conversion of 85 percent, selectivity of

---

[2] Vycor is the trade name of Corning Glass Works, Corning, N.Y., and is composed of approximately 96 percent silica with the remainder being essentially $B_2O_3$.

87 percent and a yield of 74 percent. With 0.084 mol of bromine (fed as hydrogen bromide) per mol of butene-1 and at a temperature of 650° C., butene-1 was converted to butadiene at a conversion of 93 percent, selectivity of 83 percent and yield of 77 percent.

*Example 9*

With manganese oxide, at 500° C., 0.084 mol of bromine (fed as hydrogen bromide) per mol of butene-1 and a flow rate of ½ liquid v./v./hr. butene-1 was converted to butadiene at a conversion of 82 percent, selectivity of 91 percent and a yield of 75 percent. At 600° C., with 0.028 mol of bromine (fed as hydrogen bromide) per mol of butene-1 and at a flow rate of butene of 1 liquid v./v./hr., butene-1 was converted to butadiene at a conversion of 81 percent, selectivity of 86 percent and a yield of 70 percent.

In Examples 10 through 20 a Vycor reactor having a bed temperature as specified below was used, and 2-methyl butene-2 was passed over the hereinafter described metals and compounds at a flow rate of ½ liquid v./v./hr., with 0.75 mol of oxygen and 0.06 mol of bromine per mol of 2-methyl butene-2, and 20 mols of steam per mol of 2-methyl butene-2. Conversion, selectivity and yield of isoprene are reported as mol percent.

*Example 10*

¼ inch Vycor rings coated with potassium nitrate and heated slowly in the presence of air in the reactor to convert the potassium nitrate to potassium oxide—yield of 46.4 percent isoprene at a conversion of 77.4 percent and selectivity of 59.9 percent at 725° C.

*Example 11*

Ferrous phosphide lumps in the reaction zone—yield of isoprene of 59 percent at a conversion of 69.3 percent and selectivity of 85.1 percent at 645° C.

*Example 12*

Potassium silicate deposited on Vycor rings—yield of isoprene of 45.6 percent at a conversion of 70.8 percent and selectivity of 64.4 percent at 725° C.

*Example 13*

Barium sulfide deposited on Vycor rings—yield of 51.3 percent isoprene at a conversion of 81.2 percent and selectivity of 63.2 percent at 725° C.

*Example 14*

Cast iron shavings—yield of 52.9 percent isoprene at a conversion of 62.0 percent and selectivity of 85.3 percent at 725° C.

*Example 15*

Lump manganese metal crushed to 2 to 8 mesh—yield of 57.0 percent isoprene at a conversion of 59.5 and selectivity of 95.8 percent at 550° C.

*Example 16*

Chromium metal of 4 to 8 mesh size—yield of isoprene of 47.8 percent at a conversion of 71.7 percent and selectivity of 66.7 percent at 725° C.

*Example 17*

Chromium chloride deposited on Vycor rings—yield of 50.7 at a conversion of 70.7 percent and selectivity of 71.7 percent under the same conditions.

*Example 18*

Calcium sulfate at a temperature of 725° C.—a conversion of 68.9 percent at a selectivity of 69.5 percent and a yield of 47.9 percent.

*Example 19*

Calcium carbonate at a temperature of 725° C.—a conversion of 77 percent at a selectivity of 70 percent, and a yield of 53.9 percent.

*Example 20*

A coiled tubular 304 type stainless steel (18 to 20 percent chromium, 8 to 11 percent nickel, remainder iron with maximum 0.08 carbon and 2.0 manganese) reactor, 18 feet long and 0.18 inch inside diameter, was heated to 700° C. in an electrical furnace. 2-methyl butene-2, oxygen and 1-bromopentane in a molar ratio of one mol of 2-methyl butene-2 to 0.7 mol of oxygen to 0.032 mol of bromine were passed through the heated reactor. The 2-methyl butene-2 flow rate was 0.4 liquid v./v./hr. and the pressure on the system was 4 inches of mercury absolute. The conversion of 2-methyl butene-2 to isoprene was 70.7 percent at a selectivity of 71 percent for a percentage yield of isoprene of 50.2. When the reactor tube wall is used as the source of the various catalysts generally the internal diameter will be no greater than about ¾ or about 1 inch.

In Examples 21 through 37 butene-1 was dehydrogenated to butadiene-1,3 in a Vycor reactor packed with Raschig rings coated with the designated catalyst. The bromine was introduced as HBr, with the quantity of bromine being expressed in terms of the equivalent number of mols of $Br_2$ per mol of butene-1 fed.

*Examples 21 to 23*

In Examples 21, 22 and 23 the Raschig rings were coated with cobaltic oxide. In Example 21 the bromine was fed at a rate of .028 mol of bromine per mol of butene, and in Examples 22 and 23 the molar ratio of bromine was .084 mol per mol of butene. The flow rate in Examples 21, 22 and 23 was ½ lv./v./hr.

| Example | Reactor ° C. | Conversion, mol percent | Selectivity, mol percent | Yield, mol percent |
|---|---|---|---|---|
| 21 | 500 | 76 | 86 | 65 |
| 22 | 500 | 78 | 88 | 69 |
| 23 | 550 | 95 | 91 | 86 |

*Example 24*

The Raschig rings were coated with nickelic oxide. The butene flow rate was 1 lv./v./hr. The bromine was fed at a molar ratio of .028 mol of bromine per mol of butene. At a reactor temperature of 500° C. the percent conversion was 63, the percent selectivity was 80 and the percent yield was 50.

*Examples 25 to 30*

The Raschig rings were coated with a mixture of rare earth nitrate salts. A typical analysis of the actives of the catalyst, calculated as the oxides, was by weight percent, lanthanum oxide, $La_2O_3$, 18.0%; cerium oxide, $CeO_2$, 0.4%; praseodymium oxide, $Pr_6O_{11}$, 4.2%; neodymium oxide, $Nd_2O_3$, 15.1%; samarium oxide, $Sm_2O_3$, 1.6% yttrium earth oxides, 0.2% and other rare earth oxides, 0.4% Examples 25 through 30 used this didymium oxide as the catalyst and butene-1 was the feed.

In Examples 25, 26 and 27 the butene flow rate was ½ lv./v./hr. and in Examples 28, 29 and 30 the butene flow rate was 1 lv./v./hr. The molar ratio of bromine to butene was 0.028 in Examples 25, 26 and 28 and the same ratio was 0.084 in Examples 27, 29 and 30.

| Example | Reactor ° C. | Conversion, mol percent | Selectivity, mol percent | Yield, mol percent |
|---|---|---|---|---|
| 25 | 600 | 71 | 81 | 62 |
| 26 | 650 | 83 | 73 | 60 |
| 27 | 650 | 89 | 81 | 72 |
| 28 | 600 | 69 | 79 | 55 |
| 29 | 600 | 75 | 83 | 62 |
| 30 | 650 | 79 | 82 | 65 |

*Example 31*

The Raschig rings were coated with tungstic acid. The butene-1 flow rate was ½ lv./v./hr. and the bromine was fed in a molar ratio of 0.028 mol bromine per mol of butene. The reactor temperature was 600° C. The molar conversion was 68 percent, the molar selectivity 88 percent and the molar yield was 60 percent.

*Example 32*

The general procedure of Example 31 was repeated with the exception that the butene flow rate was 1 lv./v./hr., the bromine ratio of 0.084 mol bromine per mol of butene, and the reactor temperature was 650° C. The molar conversion was 82 percent, the molar selectivity was 79 percent and the molar yield was 65 percent.

*Examples 33 to 35*

The general procedure of Example 31 was repeated with the exception that tantalum oxide was coated on Raschig rings instead of tungstic acid. In Example 33 the butene flow rate was ½ lv./v./hr., and in Examples 34 and 35 the flow rate was 1 lv./v./hr. The bromine was fed at a molar ratio of bromine to butene of 0.84 in Examples 33 and 35, and was 0.028 in Example 34.

| Example | Reactor ° C. | Conversion, mol percent | Selectivity, mol percent | Yield, mol percent |
| --- | --- | --- | --- | --- |
| 33 | 550 | 76 | 84 | 64 |
| 34 | 550 | 65 | 94 | 61 |
| 35 | 600 | 71 | 91 | 70 |

*Example 36*

The procedure of Example 1 was repeated with the exception that palladium oxide was used as the catalyst. Butadiene-1,3 was produced at a high level of conversion, selectivity and yield.

As may be seen from the examples, excellent results are obtained particularly with the atoms of the Periodic Table Groups IIA, IVB, VB, VIB, VIIB and the fourth period of Group VIII. Atoms of Mg, Ca, Ti, Zr, V, Nb, Cr, Mo, Mn, Fe, Co, Ni and mixtures thereof are particularly desirable both from the standpoint of high yields, conversions and selectivities, as well as from an economic standpoint.

As compared with processes previously suggested in the prior art, the process of this invention has numerous advantages in addition to those enumerated above. For example, the bromine by-product from the reactor such as hydrogen bromide may be readily separated from the product and may be recycled to the reactor without any further processing. The process gives high selectivities to the unsaturated product and consequently only low amounts of impurities such as oxygenated by-products or tars and polymers are produced. Less corrosion results from this process as compared to some previously suggested processes. The availability and low cost of bromine and bromine compounds contributes to making the process a highly efficient commercial process.

We claim:
1. The method of dehydrogenating acyclic aliphatic hydrocarbons having not more than 6 carbon atoms which comprises heating in the vapor phase at a temperature of greater than 400° C. an acyclic aliphatic hydrocarbon having not more than 6 carbon atoms with oxygen in a molar ratio of greater than one-fourth mol of oxygen per mol of said hydrocarbon, greater than 0.001 mol of bromine per mol of said hydrocarbon, the initial partial pressure of said hydrocarbon being equivalent to less than about one-third atmosphere at one atmosphere total pressure, with a solid catalyst having as an active constituent in contact with said hydrocarbon a material selected from the group consisting of metals, oxides, salts and hydroxides of lithium, sodium, potassium, rubidium, cesium, beryllium, magnesium, calcium, strontium, barium, scandium, lanthanum, titanium, zirconium, hafnium, vanadium, niobium, tantalum, chromium, molybdenum, tungsten, manganese, iron, cobalt, nickel, cerium, praseodymium, neodymium, and samarium, the ratio of the mols of said oxygen to the atoms of said bromine being greater than one, said catalyst being present in an amount of greater than 40 square feet of catalyst surface per cubic foot of reaction zone containing catalyst, and recovering as a major product a hydrocarbon having the same number of carbon atoms but a greater degree of unsaturation than the feed hydrocarbon.

2. The method of claim 1 wherein the said vapor phase additionally contains steam in an amount of about 4 to 30 mols per mol of said acyclic aliphatic hydrocarbon.

3. The method of dehydrogenating acyclic aliphatic hydrocarbons having not more than 6 carbon atoms which comprises heating in the vapor phase at a temperature of greater than 400° C. an acyclic aliphatic hydrocarbon selected from the group consisting of monoolefins of 4 to 6 carbon atoms and saturated hydrocarbons of 4 to 5 carbon atoms and mixtures thereof, with oxygen in a molar ratio of greater than one-fourth mol to two mols of oxygen per mol of said hydrocarbon, from greater than 0.001 mol to less than 0.2 mol of bromine per mol of said hydrocarbon, the initial partial pressure of said hydrocarbon being equivalent to less than about one-third atmosphere at one atmosphere total pressure, with a solid catalyst having as an active constituent in contact with said hydrocarbon a material selected from the group consisting of metals, oxides, salts and hydroxides of lithium, sodium, potassium, rubidium, cesium, beryllium, magnesium, calcium, strontium, barium, scandium, lanthanum, titanium, zirconium, hafnium, vanadium, niobium, tantalum, chromium, molybdenum, tungsten, manganese, iron, cobalt, nickel, cerium, praseodymium, neodymium, and samarium, the ratio of the mols of said oxygen to the atoms of said bromine being greater than one, said catalyst being present in an amount of greater than 40 square feet of catalyst surface per cubic foot of reaction zone containing catalyst, and recovering as a major product a hydrocarbon having the same number of carbon atoms but a greater degree of unsaturation than the feed hydrocarbon.

4. The method of claim 3 wherein the said acyclic aliphatic hydrocarbon is butene.

5. The method of claim 3 wherein the temperature in the said vapor phase is from about 425° C to 750° C., the said oxygen is present in a molar ratio of between about 0.4 to about 1.75 mols of oxygen per mol of the said acyclic aliphatic hydrocarbon and the said bromine is present in an amount of about 0.005 to 0.1 mol of bromine per mol of said acyclic aliphatic hydrocarbon.

6. The method of claim 3 wherein the said catalyst comprises a material selected from the group consisting of metals, oxides, salts and hydroxides of iron.

7. The method of claim 3 wherein the said catalyst comprises a material selected from the group consisting of metals, oxides, salts and hydroxides of cerium.

8. The method of claim 3 wherein the said catalyst comprises a material selected from the group consisting of metals, oxides, salts and hydroxides of manganese.

9. The method of claim 3 wherein the said catalyst comprises a material selected from the group consisting of metals, oxides, salts and hydroxides of cobalt.

10. The method of claim 3 wherein the said catalyst comprises iron oxide.

11. The method of claim 3 wherein the said catalyst is stainless steel.

12. The method of dehydrogenating acyclic aliphatic hydrocarbons having not more than 6 carbon atoms which comprises heating in the vapor phase at a temperature of greater than 400° C. an acyclic aliphatic hydrocarbon having not more than 6 carbon atoms with oxygen in a molar ratio of greater than one-fourth mol of oxygen per mol of said hydrocarbon, greater than 0.001 mol of bromine per mol of said hydrocarbon, the initial partial pressure of said hydrocarbon being equivalent to less than about one-third atmosphere at one atmosphere total pressure, with a solid catalyst having as an active constituent in contact with said hydrocarbon a material consisting essentially of an inorganic iron compound, the ratio of the mols of said oxygen to the atoms of said bromine being greater than one, said catalyst being present in an amount of greater than 40 square feet of catalyst surface per cubic foot of reaction zone containing catalyst, and recovering as a major product a hydrocarbon having the same number of carbon atoms but a greater degree of unsaturation than the feed hydrocarbon.

References Cited by the Examiner

UNITED STATES PATENTS

| | | | |
|---|---|---|---|
| 2,279,469 | 4/42 | Law et al. | 260—348 |
| 2,301,668 | 11/42 | Pier et al. | 260—680 |
| 2,326,258 | 8/43 | Schmidt et al. | 260—680 |
| 2,327,174 | 8/43 | Cass | 260—654 |
| 2,369,182 | 2/45 | Rust et al. | 260—597 |
| 2,370,513 | 2/45 | Amos et al. | 260—680 |
| 2,397,638 | 4/46 | Bell et al. | 260—680 |
| 2,399,488 | 4/46 | Hearne | 260—659 |
| 2,404,056 | 7/46 | Gorin et al. | 260—680 |
| 2,643,269 | 6/53 | Augustine et al. | 260—604 |
| 2,719,171 | 9/55 | Kalb | 260—486 |
| 2,890,253 | 6/59 | Mullineaux et al. | 260—673.5 |
| 2,898,386 | 8/59 | Raley et al. | 260—666 |
| 2,921,101 | 1/60 | Magovern | 260—680 |
| 2,945,900 | 7/60 | Alexander et al. | 260—680 |
| 3,116,338 | 12/63 | Guest et al. | 260—666 |
| 3,119,111 | 1/64 | McDonald et al. | 260—680 |

FOREIGN PATENTS 777,010  6/57  Great Britain.

OTHER REFERENCES

Moeller: "Inorganic Chemistry," published by John Wiley & Sons, New York, 1952, page 876 relied on.

Remy: "Treatise on Inorganic Chemistry," published by Elsevier Publ. Co., Amsterdam, 1956, vol. II, page 30 relied on.

PAUL M. COUGHLAN, *Primary Examiner.*

ALPHONSO D. SULLIVAN, *Examiner.*

UNITED STATES PATENT OFFICE
CERTIFICATE OF CORRECTION

Patent No. 3,210,436                          October 5, 1965

Laimonis Bajars et al.

It is hereby certified that error appears in the above numbered patent requiring correction and that the said Letters Patent should read as corrected below.

Column 2, lines 4 and 5, for "successively" read -- successfully --; line 14, for "(columbian pentoxide)" read -- (columbium pentoxide) --; column 11, line 20, for "0.84" read -- 0.084 --; line 50, for "imprities" read -- impurities --.

Signed and sealed this 20th day of September 1966.

(SEAL)
Attest:

ERNEST W. SWIDER                         EDWARD J. BRENNER
Attesting Officer                            Commissioner of Patents